United States Patent
Tsai

(10) Patent No.: US 9,717,221 B2
(45) Date of Patent: Aug. 1, 2017

(54) AQUATIC CULTIVATION SYSTEM

(71) Applicant: Han-Yi Tsai, Taipei (TW)

(72) Inventor: Han-Yi Tsai, Taipei (TW)

(*) Notice: Subject to any disclaimer, the term of this patent is extended or adjusted under 35 U.S.C. 154(b) by 81 days.

(21) Appl. No.: 14/929,776

(22) Filed: Nov. 2, 2015

(65) Prior Publication Data

US 2017/0118964 A1     May 4, 2017

(51) Int. Cl.
*A01G 29/00* (2006.01)
*A01K 63/04* (2006.01)
*A01K 63/00* (2017.01)
*A01G 31/02* (2006.01)

(52) U.S. Cl.
CPC ............ *A01K 63/045* (2013.01); *A01G 31/02* (2013.01); *A01K 63/006* (2013.01); *A01K 63/042* (2013.01); *A01K 63/047* (2013.01)

(58) Field of Classification Search
CPC .... A01G 27/00; A01G 27/001; A01G 27/003; A01G 27/005; A01G 27/006; A01G 27/008; A01G 27/02; A01G 31/00; A01G 31/02; A01K 63/003; A01K 63/045; A01K 63/042; A01K 63/047; A01K 63/04; F04F 10/00
USPC ............ 119/245, 246, 247, 248, 269; 47/79, 47/48.5, 59 R, 62 R, 62 E, 62 N, 63
See application file for complete search history.

(56) References Cited

U.S. PATENT DOCUMENTS

| 3,168,797 A * | 2/1965 | Patassy | A01G 27/003 177/207 |
| 4,265,751 A * | 5/1981 | Willinger | A01K 63/045 210/167.25 |
| 4,321,937 A * | 3/1982 | Littlehale | A01G 27/003 137/78.3 |
| 4,447,983 A * | 5/1984 | Shinada | A01G 27/005 47/48.5 |
| 4,542,762 A * | 9/1985 | Littlehale | A01G 27/00 137/136 |
| 4,846,206 A * | 7/1989 | Peterson | A01G 27/001 137/1 |
| 6,244,219 B1 * | 6/2001 | Krum | A01K 63/04 119/231 |

(Continued)

FOREIGN PATENT DOCUMENTS

TW         256996      9/1995
TW         M475813     4/2014

*Primary Examiner* — Trinh Nguyen
(74) *Attorney, Agent, or Firm* — Muncy, Geissler, Olds & Lowe, P.C.

(57) ABSTRACT

An aquatic cultivation system includes a bowl and a siphon equipment. The bowl contains a liquid. The siphon equipment includes a liquid intake tube, and a liquid exit tube. At least one of the liquid tube and the liquid exit tube includes an air vent. The siphon equipment includes a water level control element corresponding to the air vent. The water level control element includes a connection portion and a brake portion located on the connection portion. The brake portion is movable on a reciprocal movement locus when subject to change of liquid water level elevation to close or release the air vent, thereby drives the siphon equipment to draw intermittently the liquid in the bowl. As a result, filths in the bowl can be removed and an intermittent turbulent current can be generated to prevent the filths from depositing at the bottom of the bowl.

10 Claims, 11 Drawing Sheets

(56) References Cited

U.S. PATENT DOCUMENTS

| | | | | |
|---|---|---|---|---|
| 2011/0154985 A1* | 6/2011 | Mittelmark | ............ | A01G 27/00 95/1 |
| 2012/0023821 A1* | 2/2012 | Kao | ....................... | A01G 31/02 47/62 R |
| 2013/0152469 A1* | 6/2013 | Kao | ....................... | A01G 31/02 47/62 R |
| 2015/0289459 A1* | 10/2015 | Tsai | ........................ | F04F 10/00 47/79 |
| 2015/0289463 A1* | 10/2015 | Moriarty | ................ | A01G 31/02 47/62 R |
| 2015/0342133 A1* | 12/2015 | Nakajima | .............. | A01G 31/02 47/62 R |

* cited by examiner

AQUATIC CULTIVATION SYSTEM

FIELD OF THE INVENTION

The present invention relates to an aquatic cultivation system and particularly to an aquatic cultivation system that is capable of removing filths in a bowl and generating intermittently turbulent current to prevent the filths from depositing at the bottom of the bowl.

BACKGROUND OF THE INVENTION

Ornamental aquarium is quite fashionable these days. Many people like to cultivate aquatic animals or plants in a fish bowl in homes or offices for pleasure, improving feng shui or as a hobby. In order to constantly maintain the cultivation environment of the fish bowl in a clean condition most breeders try to replenish the water in the fish bowl regularly. To meet this purpose many types of facilities have been developed. For instance, Taiwan patent No. 256996 discloses an excreta collection apparatus located at the bottom of an aquarium. It includes an excreta collection box, a suction tube and a water pump. The excreta collection box is located at the bottom of the aquarium and includes two slant surfaces tilted toward the center. The suction tube is located in the center of the two slant surfaces and connected to the water pump. During collection of excreta filths in the aquarium slide through the two slant surfaces around the suction tube because of the suction force generated by the water pump to the suction tube. Moreover, a liquid supply device also is provided to inject water continuously into the aquarium. The water pump also is set to draw intermittently the water contained the filths around the suction tube. Hence water level in the aquarium changes within a definite range through collaborating of the liquid supply device and the water pump, thereby the filths at the bottom of the aquarium can be removed through suction of the water pump.

In the technique disclosed in the aforesaid patent No. 256996 setting water pump operation conditions requires constant attention of water level dropping range of the aquarium. The relationship between the water level dropping range and operation time and frequency of the water pump can only be accurately determined after a number of trials in setting and adjustment.

Taiwan patent No. M475813 also discloses an automatic cleaning fish breeding apparatus which includes a body, a slant panel and a water directing tube. The slant panel is located at the bottom of the body. The water directing tube is vertically located at a lower position of the slant panel, and includes a top run through one side of the body and bent downward outside the body to form a water outlet. When in use water can be continuously injected into the body through a liquid supply device. When water level has reached the top of water directing tube a siphon phenomenon takes place, namely the water directing tube continuously discharges the water from the body, and excreta of aquatic animals or external filths deposited at the bottom of the body can be discharged with water through the water directing tube until the water level has reached below the water outlet. Then the water level of the body rises again through continuous water injection of the liquid supply device until reaching the top of the water directing tube, and the siphon phenomenon of the water directing tube takes place again. As a result, the water level of the body can be adjusted between the top of the water directing tube and the water outlet, and the filths in the water can be discharged through the water directing tube.

However, the water directing tube disclosed in the aforesaid M475813 merely is an element formed in a single specification, and the elevation of the water outlet cannot be adjusted to change the lowering range of the water level in the body according to the height of different fish bowls or user's requirements, and the siphon phenomenon also cannot be suspended as desired that could cause excessive drop of the water level and affect living environment of the creatures in the fish bowl.

SUMMARY OF THE INVENTION

The primary object of the present invention is to solve the complicated use problems of the conventional techniques.

To achieve the foregoing object the present invention provides an aquatic cultivation system that includes a bowl and a siphon equipment. The bowl contains a liquid. The siphon equipment is located in the bowl to provide a siphon function to draw the liquid from the bottom of the bowl to the exterior. The siphon equipment includes a liquid intake tube extended to the bottom end of the bowl, a U-shaped tube connected to the liquid intake tube and a liquid exit tube connected to the U-shaped tube and extended outside the bowl. At least one of the liquid tube and the liquid exit tube includes an air vent corresponding to an internal section of the bowl. The siphon equipment also includes a water level control element corresponding to the air vent. The water level control element includes at least one connection portion and a brake portion which is connected to the connection portion and includes a leaning surface. The water level control element is subject to action of liquid level elevation to form a reciprocal movement locus. The reciprocal movement locus includes a first position defined by closing the air vent via the leaning surface and a second position with the air vent released by the leaning surface to allow external air to pass through the air vent to suspend the siphon function. When the water level control element receives the floating force of the liquid to close the air vent through the leaning surface the siphon equipment generates the siphon function to draw the liquid in the bowl. When the water level control element does not receive the floating force of the liquid and moves on the reciprocal movement locus to release the air vent the siphon function of the siphon equipment is inactive and drawing of the liquid is suspended. Thus filths in the bowl can be removed. Meanwhile, the siphon equipment can intermittently generate turbulent current to prevent the filths from depositing at the bottom of the bowl.

In one embodiment the brake portion includes a floating structure coupled with the connection portion and an elastic colloid located on the floating structure to seal the air vent, and the leaning surface is located at one side of the elastic colloid facing the air vent. Furthermore, the floating structure is hollow and includes an air chamber inside.

In another embodiment the water level control element includes a sleeve connected to the connection portion and coupled with either the liquid intake tube or the liquid exit tube, and the air vent is located on the sleeve.

In yet another embodiment the interior space of the bowl is divided by a spacer to form a cultivation zone and a liquid drawing zone. The spacer includes at least on turbulent current port located at the bottom side thereof to communicate with the cultivation zone and the liquid drawing zone to allow the liquid to pass through.

In yet another embodiment the bowl includes a first bottom surface located in the cultivation zone and a second bottom surface located in the liquid drawing zone, and the first bottom surface is at an elevation higher than the second bottom surface.

In yet another embodiment the bowl includes an indented filth collection zone located in the center thereof and a filth collection slant chute inclined and extended from the periphery of the bowl toward the filth collection zone.

In yet another embodiment the bowl includes an elevation adjustment element inside that includes a flow directing passage connected to the turbulent current port.

In yet another embodiment the siphon equipment includes a siphon ancillary element located at a distal end of the liquid intake tube. The siphon ancillary element includes a siphon air chamber connected to the liquid intake tube, a liquid inlet communicating with the siphon air chamber and an isolation element located in the liquid inlet.

In yet another embodiment the aquatic cultivation system further includes a plant cultivation pot which receives the liquid from the liquid exit tube, and returns the liquid to the bowl for saving by drawing the liquid from the plant cultivation pot via a liquid drawing element.

By means of the structure set forth above, the invention can provide advantageous features as follows:

The invention provides the water level control element in the siphon equipment that is corresponding to the air vent. The water level control element can be actuated by the elevation of liquid water level to move on the reciprocal movement locus during which the leaning surface can close or release the air vent, consequentially the siphon equipment can generate the siphon function to draw the liquid in the bowl that also contains the filths; or the siphon function can be inactivated to suspend the siphon equipment from drawing the liquid contained the filths. Thus, during the liquid is injected continuously into the bowl the siphon equipment can automatically adjust the water level in the bowl in a definite range and draw intermittently the liquid in the bowl, thereby the filths in the bowl can be removed and turbulent current is generated intermittently to prevent the filths from depositing at the bottom of the bowl. In addition, the elevation of the water level control element can be directly adjusted by users to change the liquid lowering range to match the volume of the bowl or use requirements, thereby overcome the use and complicated setting problems of the conventional techniques.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
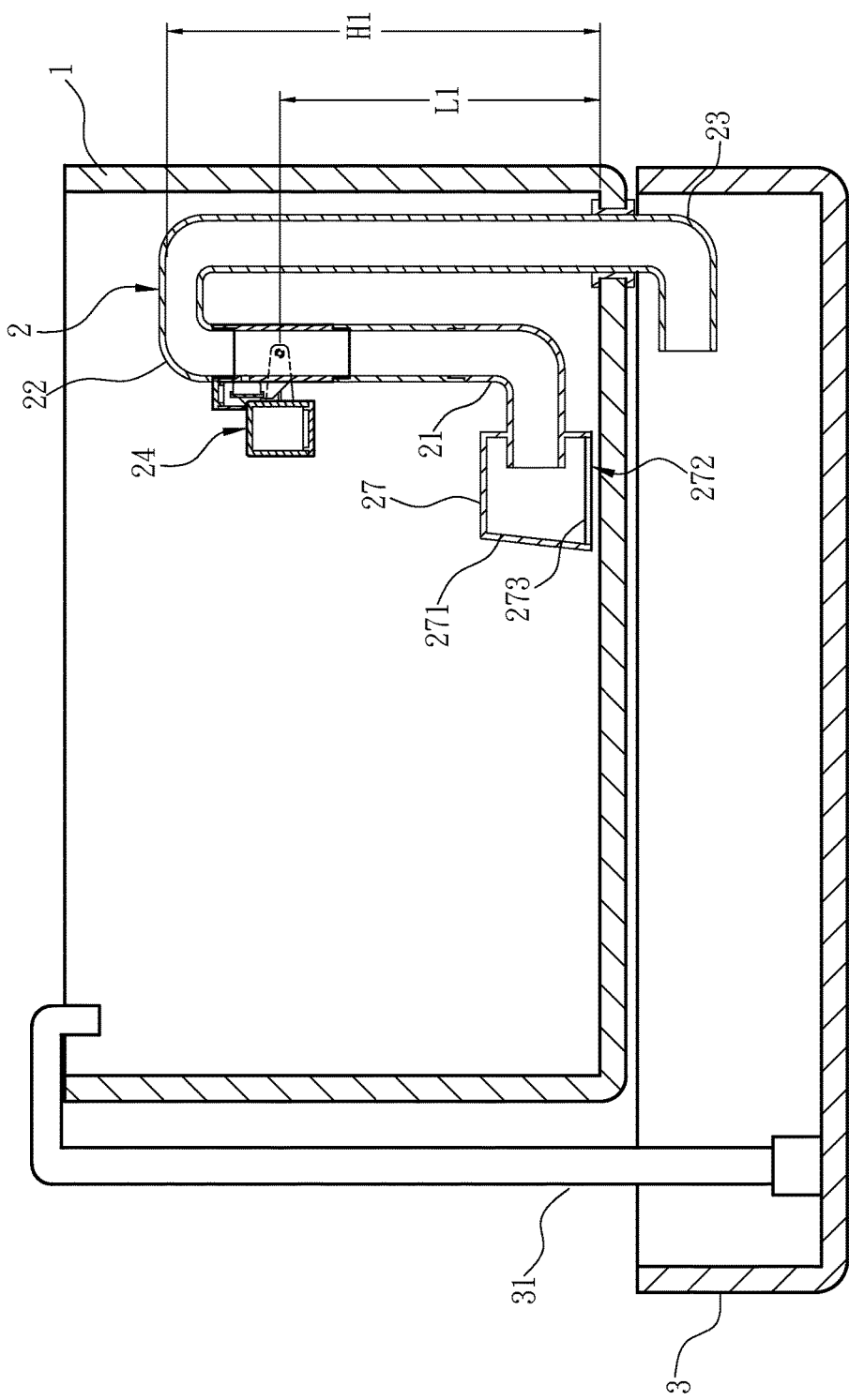
FIG. 1 is a lateral sectional view of a first embodiment of the invention.
Figure 2A:
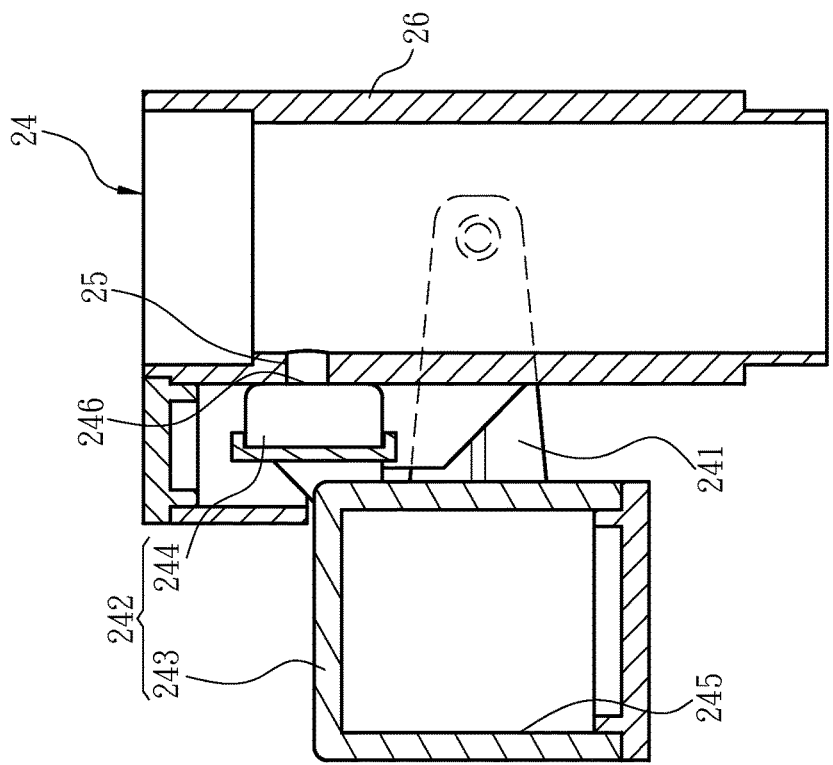
FIG. 2A is a lateral sectional view of the water level control element of the invention.
Figure 2B:
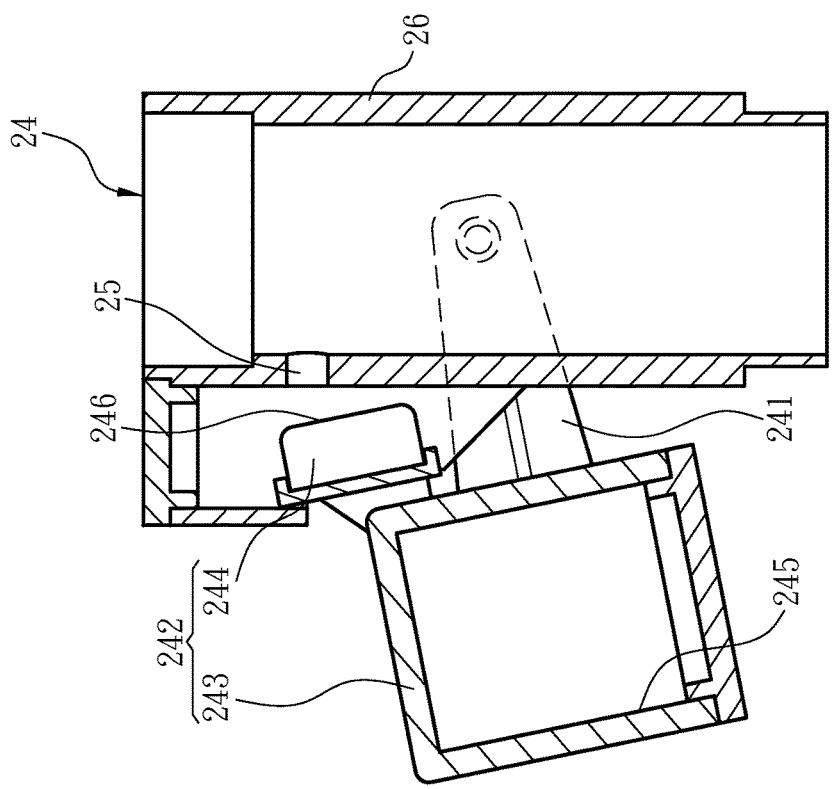
FIG. 2B is another lateral sectional view of the water level control element of the invention.
Figure 7:
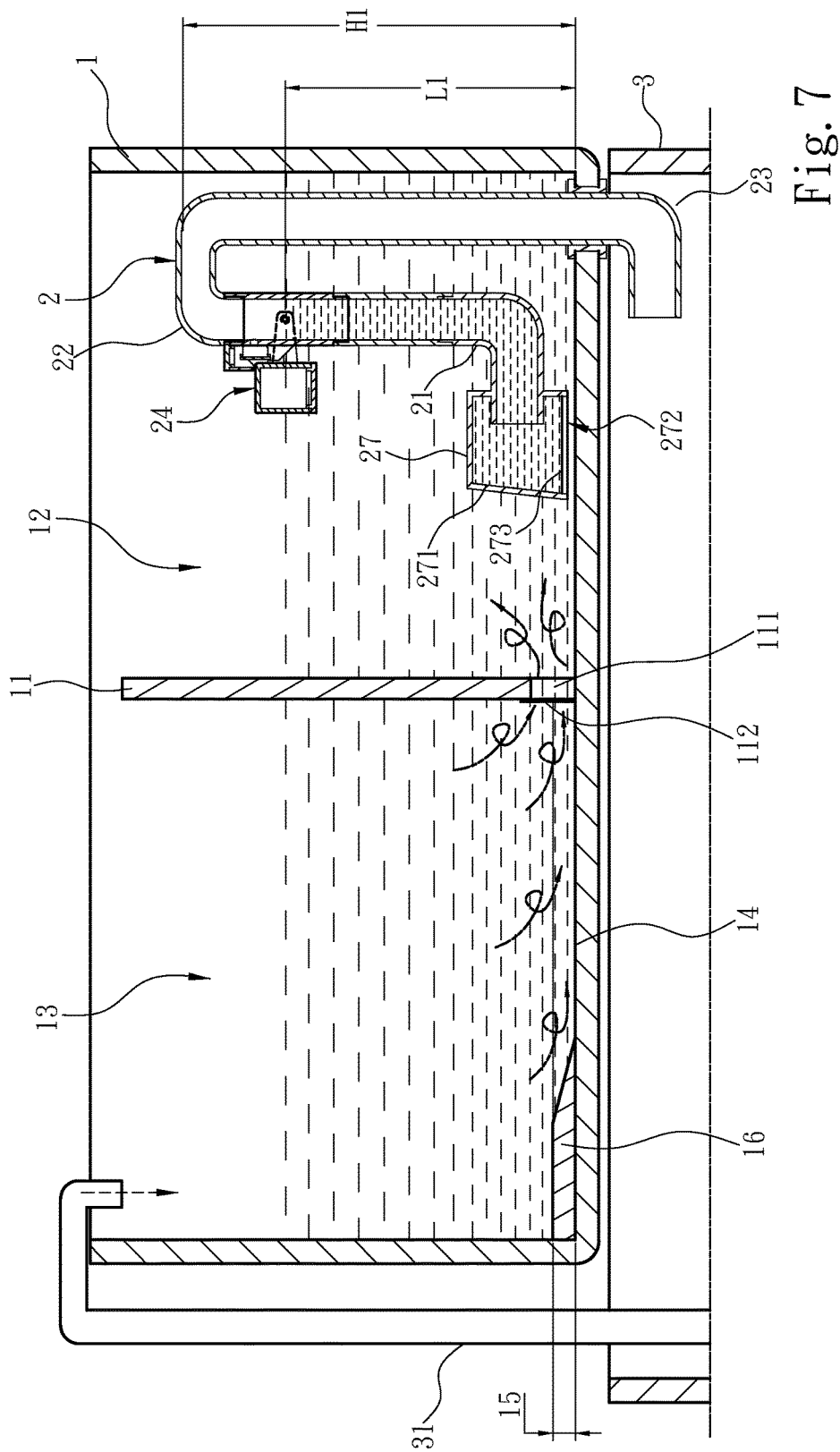
FIG. 7 is a lateral sectional view of the second embodiment of the invention.
Figure 8:
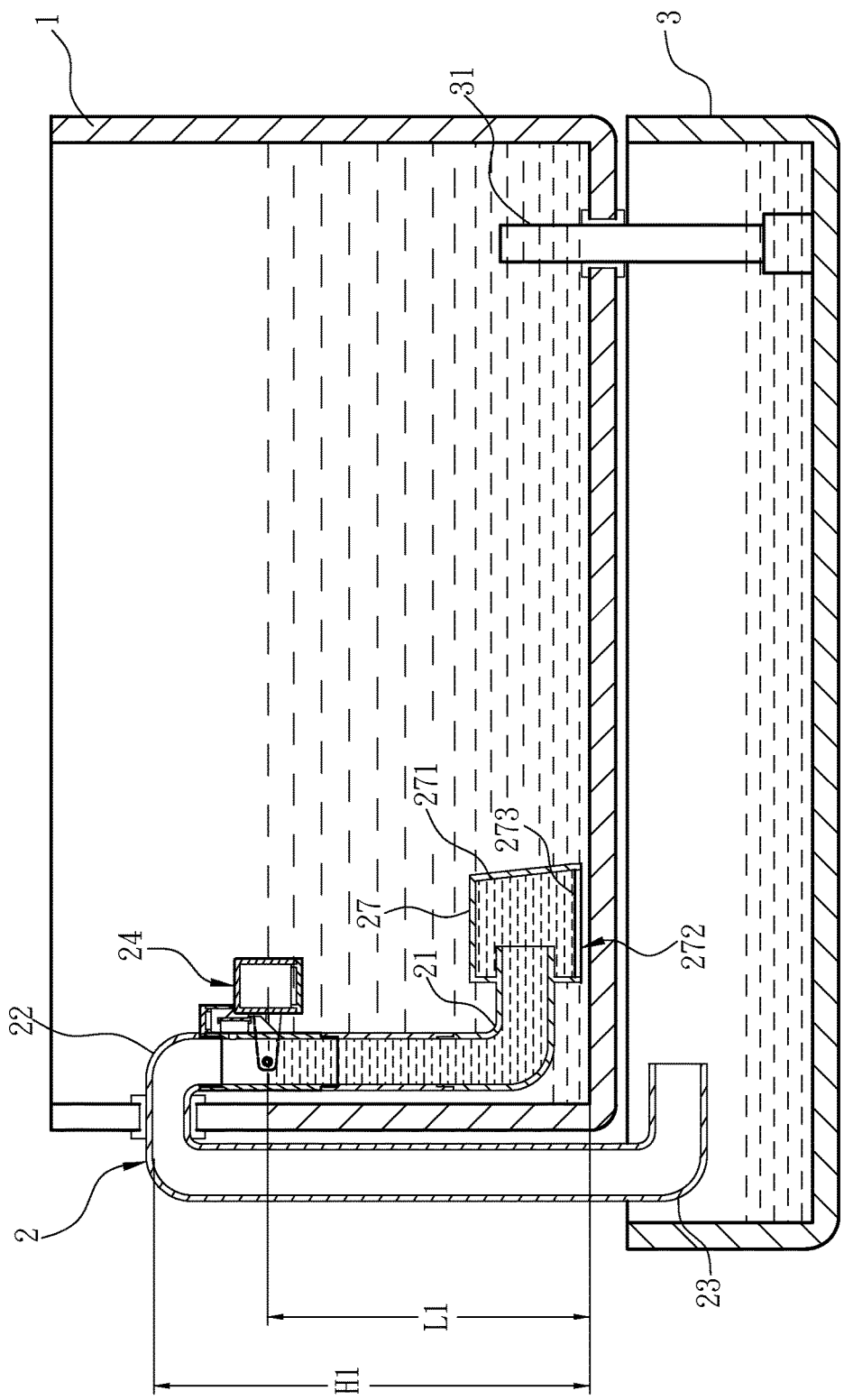
FIG. 8 is a lateral sectional view of a third embodiment of the invention.

As shown in FIGS. 1, 2A, 2B and 8, the present invention aims to provide an aquatic cultivation system that includes a bowl 1 and a siphon equipment 2. The siphon equipment 2 is located in the bowl 1 and includes a liquid intake tube 21, a ⊓-shaped tube 22, a liquid exit tube 23 and a water level control element 24. The liquid intake tube 21 is extended toward the bottom end of the bowl 1 to form a gap with the bottom end. The U-shaped tube includes an opening to allow the top portion of the liquid intake tube 21 to be installed thereon and another opening without connecting to the liquid intake tube 21. The liquid exit tube 23 is extended outside the bowl 1 and includes an outlet located lower than the bottom side of the bowl 1. In one embodiment the liquid intake tube 21, the U-shaped tube 22 and the liquid exit tube 23 are located in the bowl 1 with a distal end of the liquid exit tube 23 run through the bottom of the bowl 1 (as shown in FIG. 1). In another embodiment the U-shaped tube 22 runs through one side wall of the bowl 1, and the liquid exit tube 23 is located outside the bowl 1 (as shown in FIG. 8) to be externally positioned. In addition, at least one of the liquid intake tube 21 and the liquid exit tube 23 includes an air vent 25 corresponding to an internal section of the bowl 1. The water level control element 24 is corresponding to the air vent 25. More specifically, the air vent 25 can be located at least on either the liquid intake tube 21 or the liquid exit tube 23. In this embodiment the air vent 25 is located on the liquid intake tube 21 as an example for discussion. The water level control element 24 includes a connection portion 241 and a brake portion 242 connected to the connection portion 241. The connection portion 241 can be a connection arm connected to at least either the liquid intake tube 21 or the liquid exit tube 23. Furthermore, the connection portion 241 is connected to the liquid intake tube 21 or the liquid exit tube 23 in a pivotal manner so that the brake portion 242 can form a reciprocal movement locus against the liquid intake tube 21 through the connection portion 241 and move to a first position or a second position. FIG. 2A illustrates the brake portion 242 at the first position. The brake portion 242 further includes a leaning surface 246. When the brake portion 242 is moved on the reciprocal movement locus to the first position the leaning surface 246 closes the air vent 25 to block external air from entering the liquid intake tube 21 via the air vent 25. FIG. 2B shows the brake portion 242 at the second position. When the brake portion 242 is moved on the reciprocal movement locus to the second position the leaning surface 246 is moved away from the air vent 25 to release thereof so that the external air can enter the liquid intake tube 21 via the air vent 25. The brake portion 242 further includes a floating structure 243 connected to the connection portion 241 and an elastic colloid 244 located on the floating structure 243 to face the liquid intake tube 21. The floating structure 243 is hollow and includes an air chamber 245. More specifically, the leaning surface 246 is located at one side of elastic colloid 244 facing the air vent 25. The water level control element 24, through the floating structure 243 floating on water surface and the leaning surface 246, can close the air vent 25. It is to be noted that the siphon equipment 2 defines a lower water level line L1 through the position of the water level control element 24 and a higher water level line H1 through the position of the U-shaped tube 22. To facilitate discussion, as shown in FIGS. 1, 3 through 5, 7, 8 and 11, the distance between the lower water level line L1 and the higher water level line H1 are enlarged. In practice, on finished products the distance between the lower water level line L1 and the higher water level line H1 is close to the top of the bowl 1 and does not occupy too much in proportion.

As previously discussed, aside from forming the air vent 25 on at least one of the liquid intake tube 21 and the liquid exit tube 23, in another embodiment the water level control element 24 further can include a sleeve 26 coupled on at least either the liquid intake tube 21 or the liquid exit tube 23, and the air vent 25 is located on the sleeve 26, and the liquid intake tube 21 or the liquid exit tube 23 includes a round hole corresponding to the air vent 25 to communicate therewith.

Figure 3:
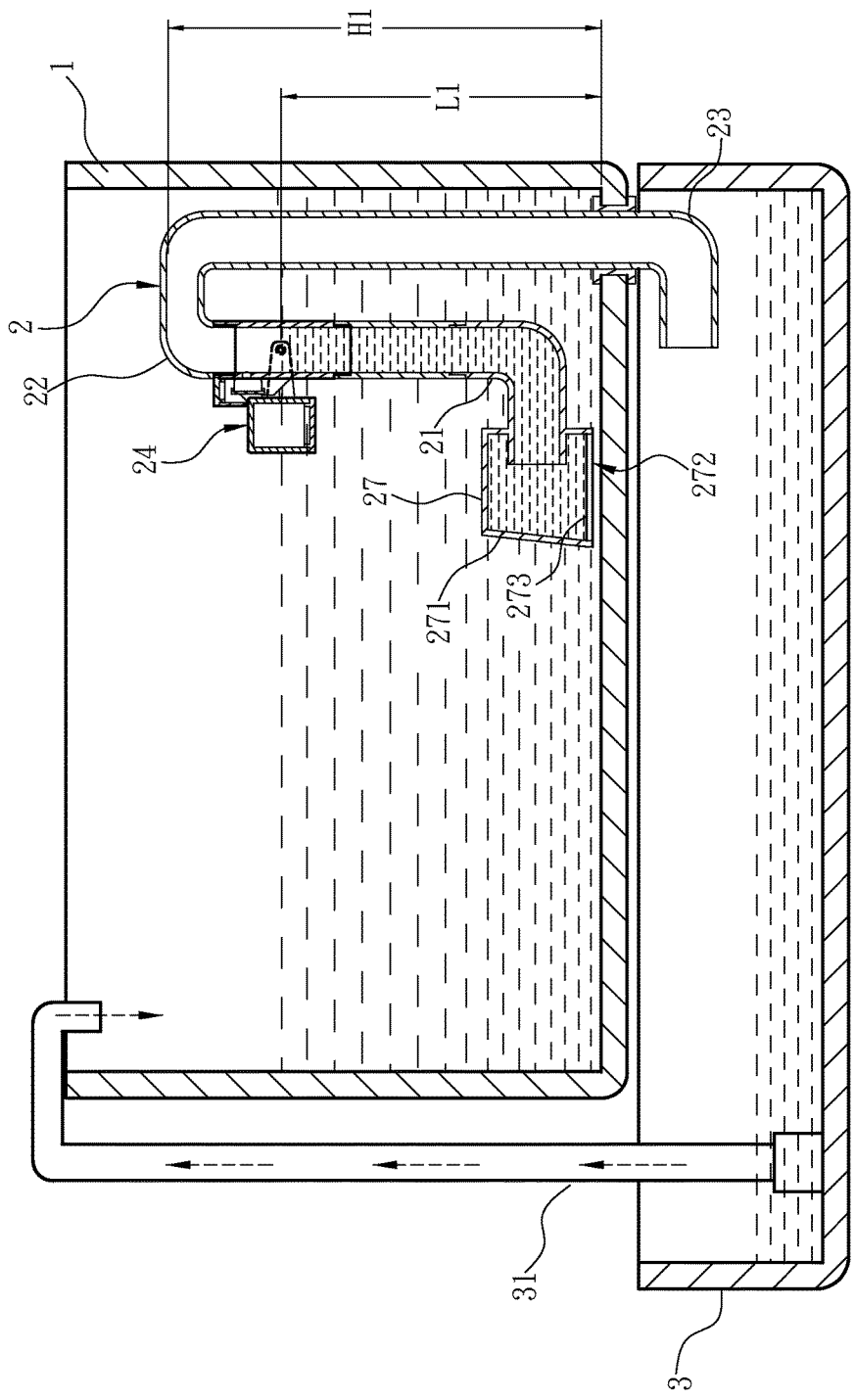
FIG. 3 is a schematic view of the first embodiment of the invention in use condition-1.
Figure 4:
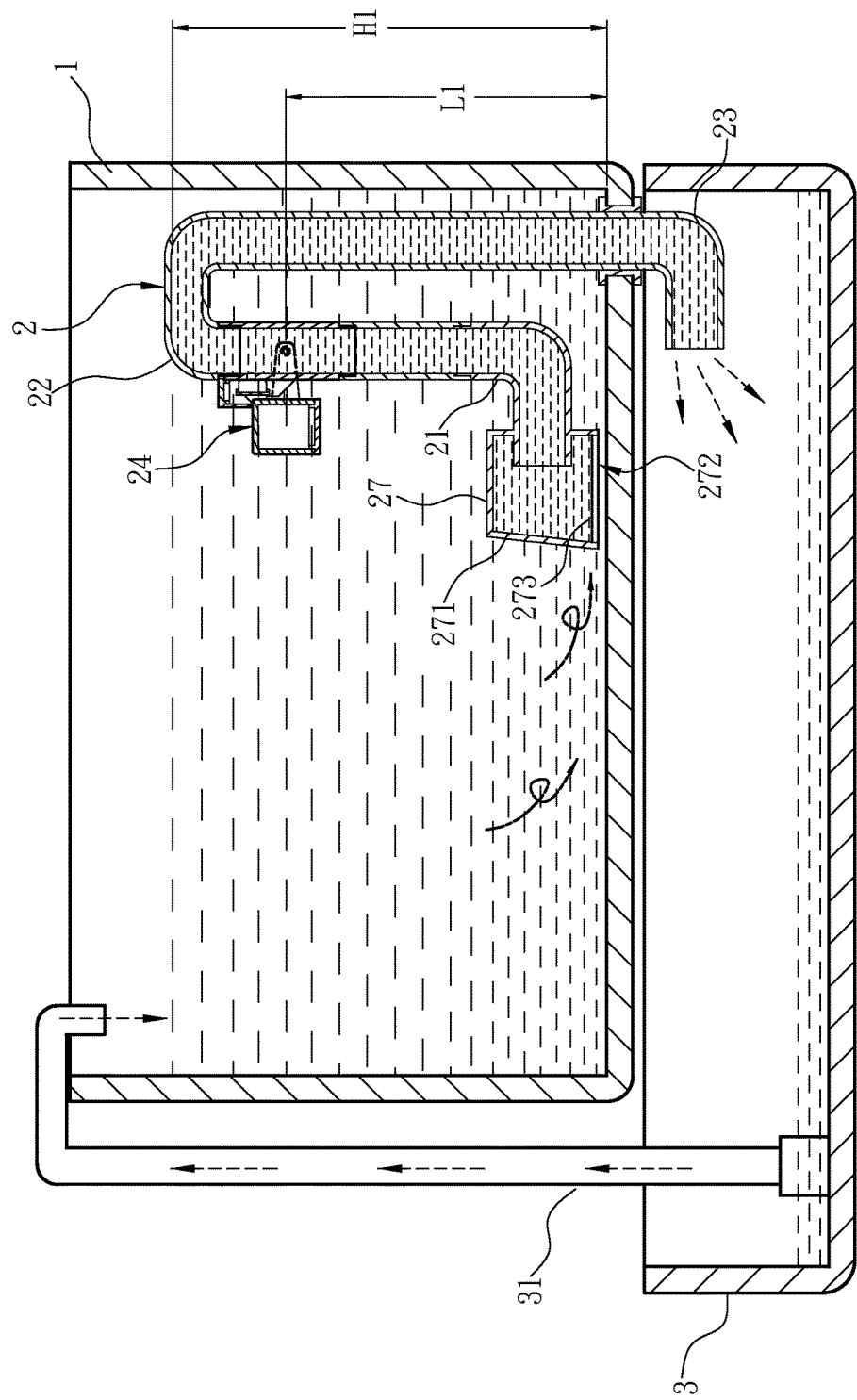
FIG. 4 is a schematic view of the first embodiment of the invention in use condition-2.
Figure 5:
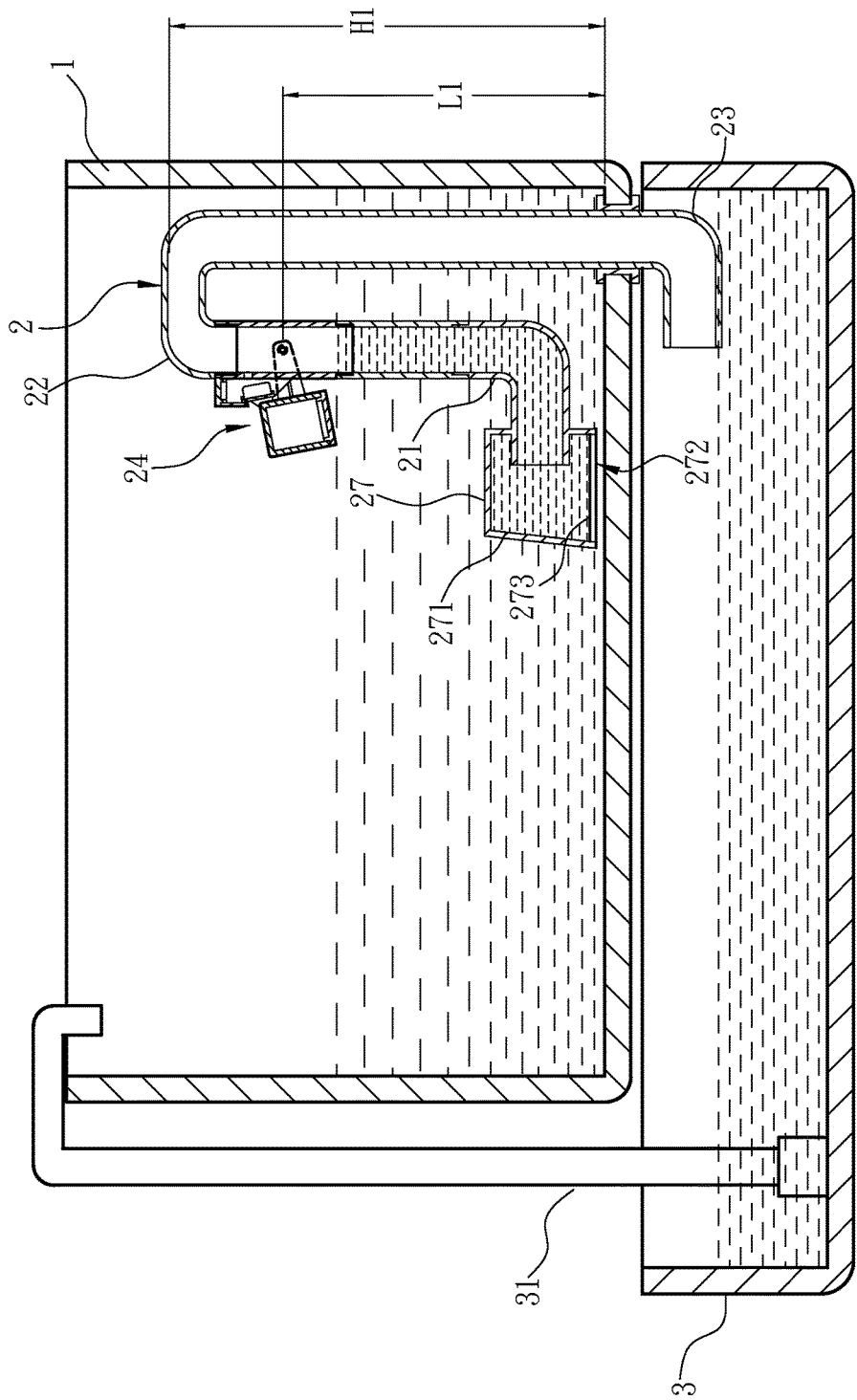
FIG. 5 is a schematic view of the first embodiment of the invention in use condition-3.

As shown in FIGS. 3 through 5, during implementation of the invention the bowl 1 contains a liquid for cultivation of aquatic creatures (such as fish, seaweeds or the like). The brake portion 242 receives floating forces of the liquid to move on the reciprocal movement locus such that the brake portion 242 can swing to the first position to close the air vent 25 (as shown in FIG. 3). More specifically, when the brake portion 242 floats in the liquid the floating structure 243 also floats in the liquid via the air chamber 245, and the leaning surface 246 closes the air vent 25. In the previous condition a liquid drawing element 31 can be deployed to inject the liquid continuously through a filter bowl 3 into the bowl 1 so that liquid level in the bowl 1 and the liquid intake tube 21 rises at the same time, and when the liquid level has reached the higher water level line H1 the liquid flows out through the liquid exit tube 23, then the siphon equipment 2 enters a first state of siphon function (as shown in FIG. 4). More specifically, at the first state the liquid continuously flows out through the liquid exit tube 23 at a position lower than the liquid intake tube 21 (i.e. the siphon function), thereby the liquid intake tube 21 continuously draws the liquid from the interior of the bowl 1, and the excreta of the aquatic creatures or external filths in the bowl 1 can be removed. Moreover, the liquid exit tube 23 can be extended into the filter bowl 3 which can include a filter layer (not shown in the drawings). Hence the liquid contained the filths that is discharged through the liquid exit tube 23 can be filtered by the filter layer, then the liquid drawing element 31 replenishes the filtered liquid to the bowl 1. When the liquid in the bowl 1 drops to the lower water level line L1 due to the siphon function the siphon equipment 2 enters a second state. More specifically, at the second state the brake portion 242 losses part or all of the upward floating force of the liquid so that the brake portion 242 is swung to the second position on the reciprocal movement locus to release the air vent 25 (as shown in FIG. 5), then external air can enter the liquid intake tube 21 via the air vent 25 to disable the siphon function and stop the liquid intake tube 21 from continuously drawing the liquid contained the filths in the bowl 1. When the siphon equipment 2 stops discharging the liquid the liquid in the bowl 1 is replenished through the liquid drawing element 31 to rise to the higher water level line H1, and the siphon equipment 2 enters again the first state. Thus the siphon equipment 2 can be switched to and fro between the first state and the second state and allow the liquid in the bowl 1 to rise and fall rapidly between the higher water level line H1 and the lower water level line L1 somewhat like ebb and flow of tide. Meanwhile, the siphon equipment 2 can intermittently draw the liquid to remove the filths in the bowl 1 and generate turbulent current intermittently to prevent the filths from depositing at the bottom of the bowl 1. In addition, users can also directly adjust the elevation of the water level control element 24 to change the position of the lower water level line L1 to alter the lowering range of the liquid to match the volume of the bowl 1 or meet use requirements, thereby resolve the complicated use problem occurred to the conventional techniques.

Figure 6:
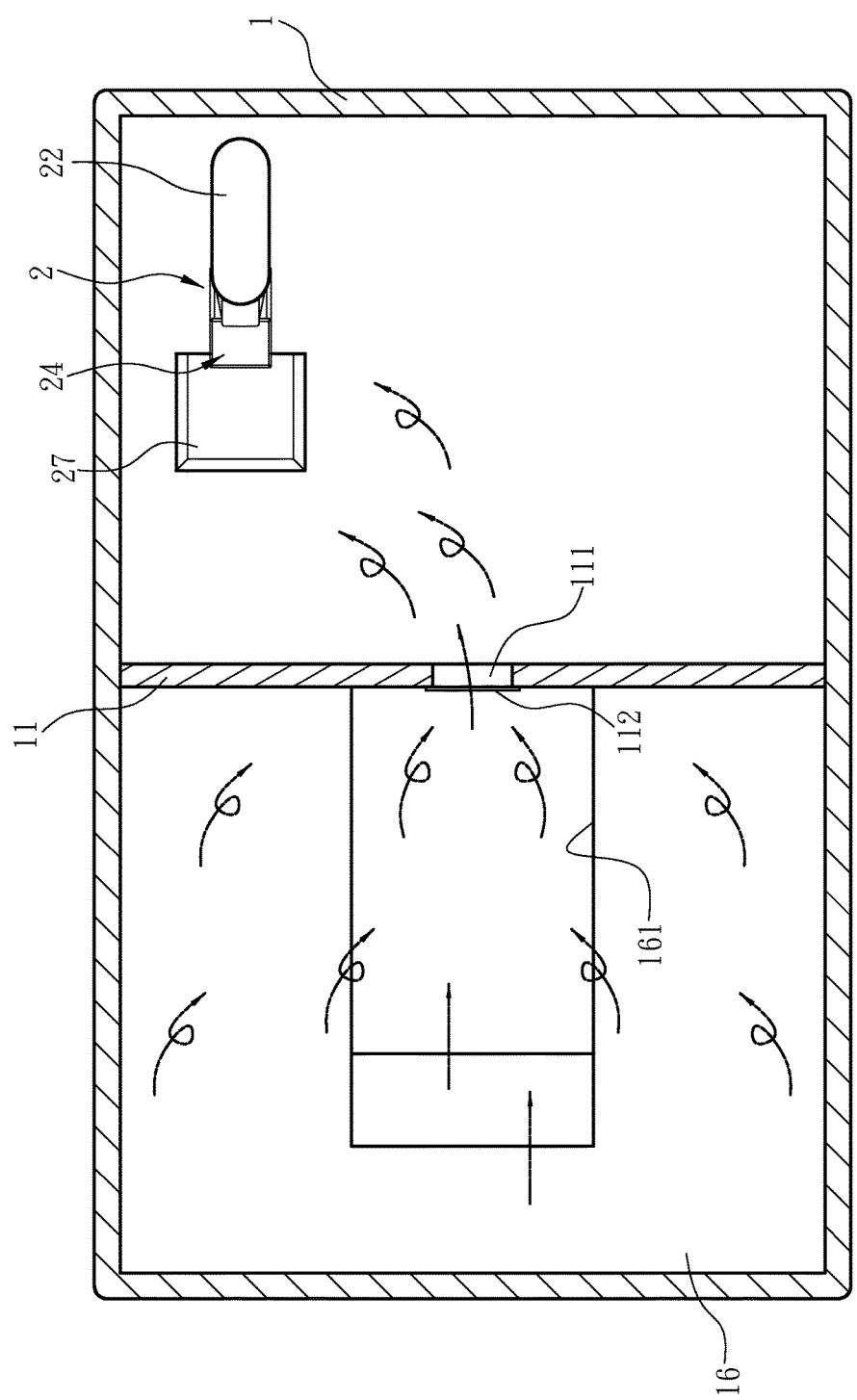
FIG. 6 is a top view of a second embodiment of the invention.

In order to prevent the filths from depositing at the bottom of the bowl 1, as shown in FIGS. 6 and 7, the bowl 1 can include a spacer 11 inside to divide the interior into a cultivation zone 12 to breed the aquatic creatures and a liquid drawing zone 13 to hold the siphon equipment 2. The spacer 11 includes a turbulent current port 111 to allow the liquid in the cultivation zone 12 to flow to the liquid drawing zone 13. Furthermore, when the siphon equipment 2 enters the first state the liquid is drawn from the cultivation zone 12 to the turbulent current port 111 of a smaller size to generate an eddy current. As a result, during switching between the first state and the second state the siphon equipment 2 can intermittently generate the eddy current in the cultivation zone 12 to disturb the filths in the cultivation zone 12 to facilitate flowing of the filths through the turbulent current port 111 into the liquid drawing zone 13 and drawing into the liquid intake tube 21. Such process also can prevent the filths from depositing at the bottom of the cultivation zone 12. In one embodiment the turbulent current port 111 includes a first filter 112 which can be a filter mesh or filter cotton to prevent the aquatic creatures in the bowl 1 from being sucked into the liquid intake tube 21.

As previously discussed, through the siphon equipment 2 the filths in the bowl 1 can be sucked and removed. In another embodiment, as show in FIGS. 6 and 7, the bowl 1 can include a first bottom surface 14 in the cultivation zone 12 and a second bottom surface 15 in the liquid drawing zone 13. The first bottom surface 14 is at an elevation higher than that of the second bottom surface 15. When the siphon equipment 2 enters the first state to perform the siphon function the liquid intake tube 21 draws the liquid in the bowl 1 so that the liquid flows from the cultivation zone 12 toward the turbulent current port 111 to generate the eddy current through which filths on the first bottom surface 14 can be swept and flown with the liquid toward the turbulent current port 111, and further flow to the liquid drawing zone 13 to be sucked by the liquid intake tube 21, then the liquid contained the filths can be discharged through the U-shaped tube 22 and the liquid exit tube 23.

Furthermore, aside from directly and integrally forming the first bottom surface 14 at the bottom of the bowl 1, in yet another embodiment the bowl 1 can also include an elevation adjustment element 16 located inside and formed at a thickness equal to the height of the first bottom surface 14. The elevation adjustment element 16 includes a flow directing passage 161 connected to the turbulent current port 111. When the siphon equipment 2 enters the first state the liquid in the cultivation zone 12 can flow through the flow directing passage 161 toward the turbulent current port 111 to generate an eddy current, thereby disturb and sweep the filths deposited on the surface of the elevation adjustment element 16, and through the liquid intake tube 21 in the liquid drawing zone 13 the liquid contained the filths can be sucked, then discharged through the U-shaped tube 22 and the liquid exit tube 23.

Figure 9:
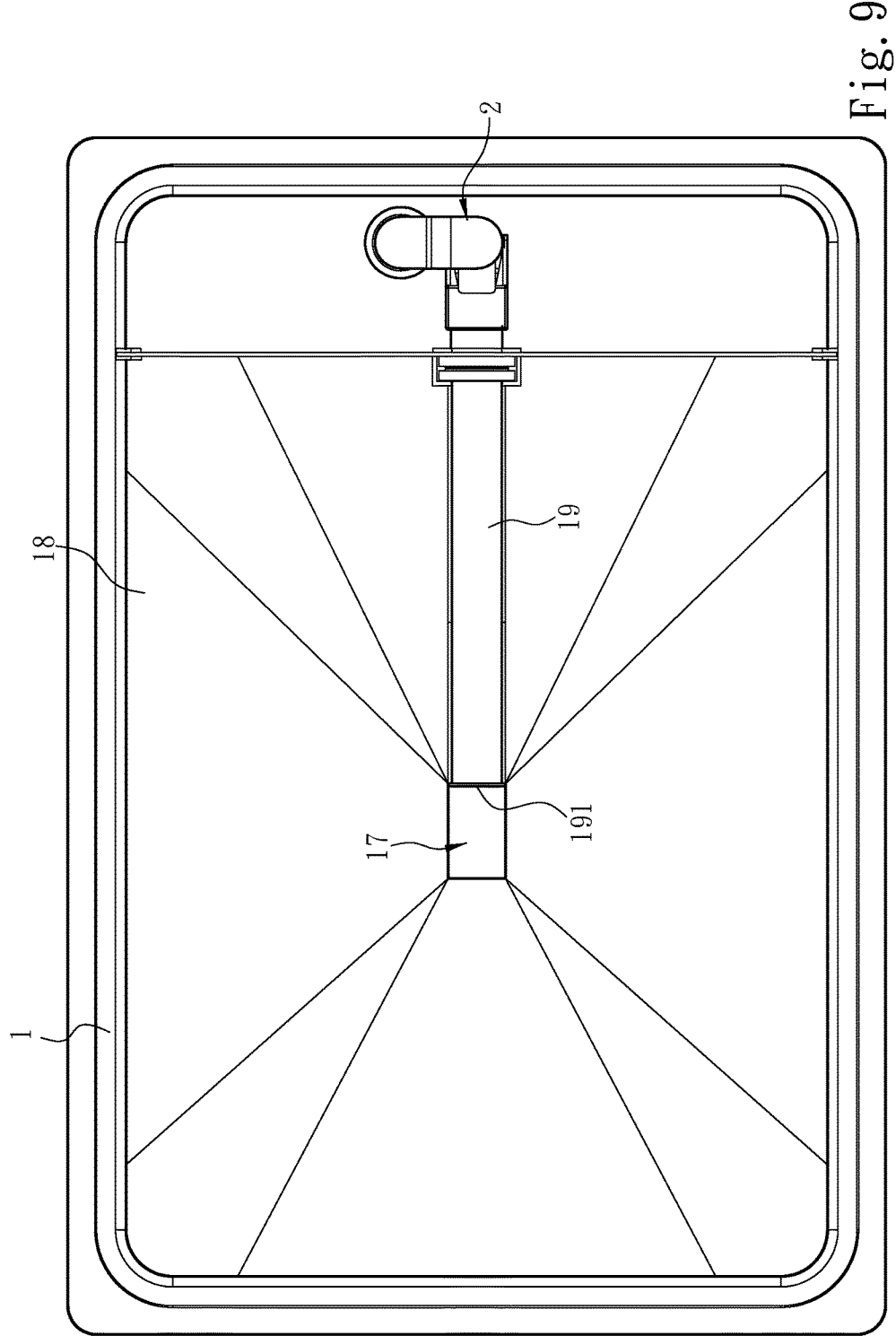
FIG. 9 is a top view of a fourth embodiment of the invention.
Figure 10:
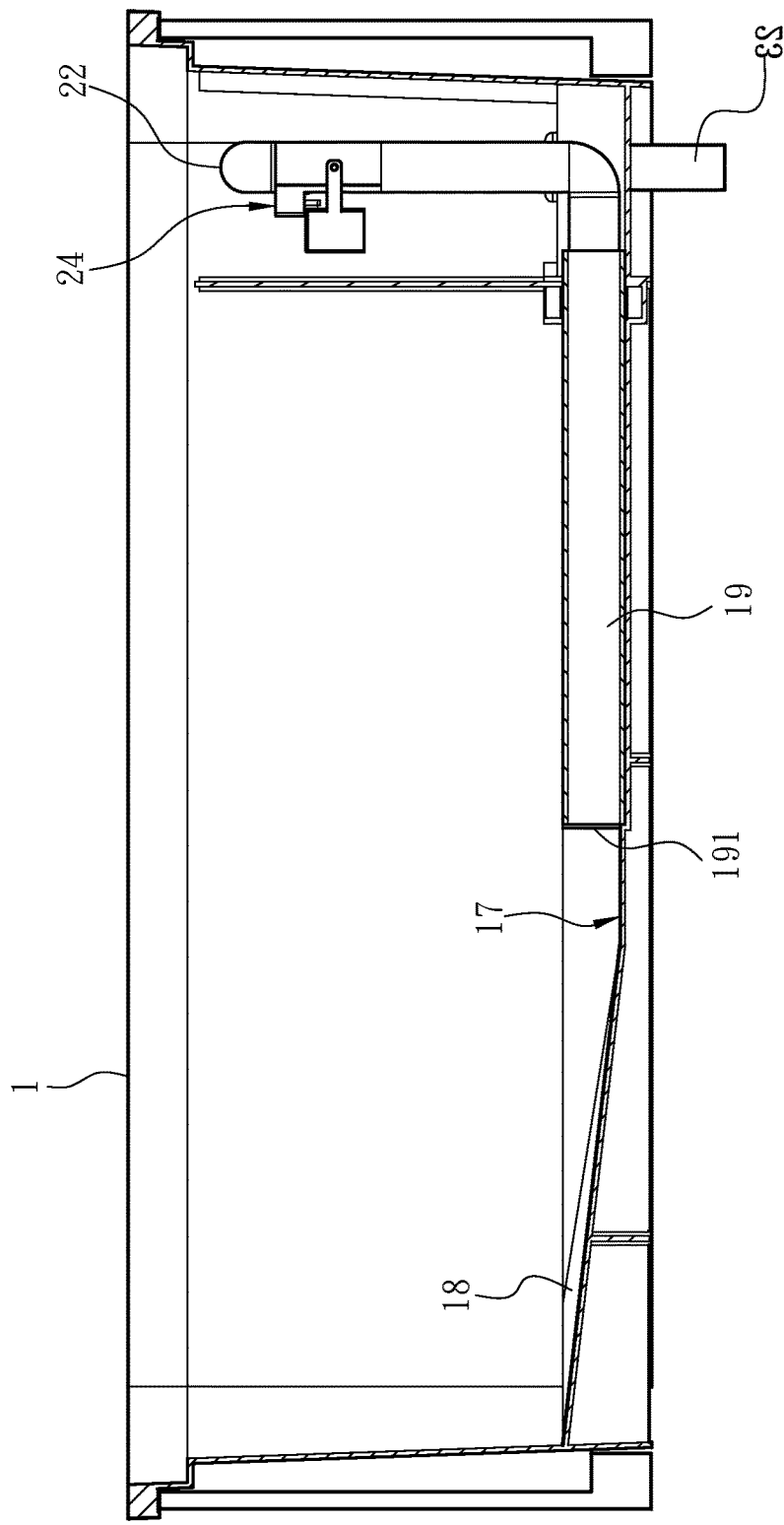
FIG. 10 is a lateral sectional view of the fourth embodiment of the invention.

As shown in FIGS. 9 and 10, to prevent the filths from depositing at the bottom of the bowl 1, in yet another embodiment the bowl 1 includes an indented filth collection zone 17 in the center thereof, a filth collection slant chute 18 inclined from the periphery of the bowl 1 toward the filth collection zone 17, and a conveying tube 19 to communicate with the filth collection zone 17 and the liquid intake tube 21. Thus, the filths in the bowl 1 can drop onto the filth collection slant chute 18 and slide to the filth collection zone 17 to be gathered together. Moreover, when the siphon equipment 2 enters the first state the liquid flows from the cultivation zone 12 toward the filth collection zone 17 of a smaller size to generate an eddy current which in turn sweeps the filths in the cultivation zone 12 to the filth collection zone 17, then the liquid intake tube 21, through the conveying tube 19, can suck the filths in the filth collection zone 17, and the liquid contained the filths can be discharged through the U-shaped tube 22 and the liquid exit tube 23. As a result, the filths can be prevented from depositing at the bottom of the bowl 1. In yet another embodiment the conveying tube 19 can include a distal end with a second filter 191 located thereon. The second filter 191 can be a filter mesh or filter cotton, through which the aquatic creatures in the bowl 1 can be prevented from being sucked into the conveying tube 19.

By means of the structure set forth above, the invention can convey the filths through the liquid intake tube 21, the U-shaped tube 22 and the liquid exit tube 23. Moreover, after the siphon equipment 2 has entered the first state, the aquatic creatures in the bowl 1 might swim close to the liquid intake tube 21 and be sucked into the liquid intake tube 21 or clog the liquid intake tube 21. To avert such a problem, as shown in FIG. 1, in yet another embodiment the siphon equipment 2 can include a siphon ancillary element 27 located at a distal end of the liquid intake tube 21. The siphon ancillary element 27 includes a siphon air chamber 271 communicating with the liquid intake tube 21, a liquid inlet 272 communicating with the siphon air chamber 271 and an isolation element 273 located on the liquid inlet 272. The isolation element 273 can be a filter such as a filter mesh or filter cotton. While the siphon equipment 2 enters the first state and generates the siphon function the siphon scope can be enlarged through the liquid inlet 272, and the aquatic creatures can be isolated through the isolation element 273 to prevent the aquatic creatures from being sucked into or clogging the liquid intake tube 21.

Figure 11:
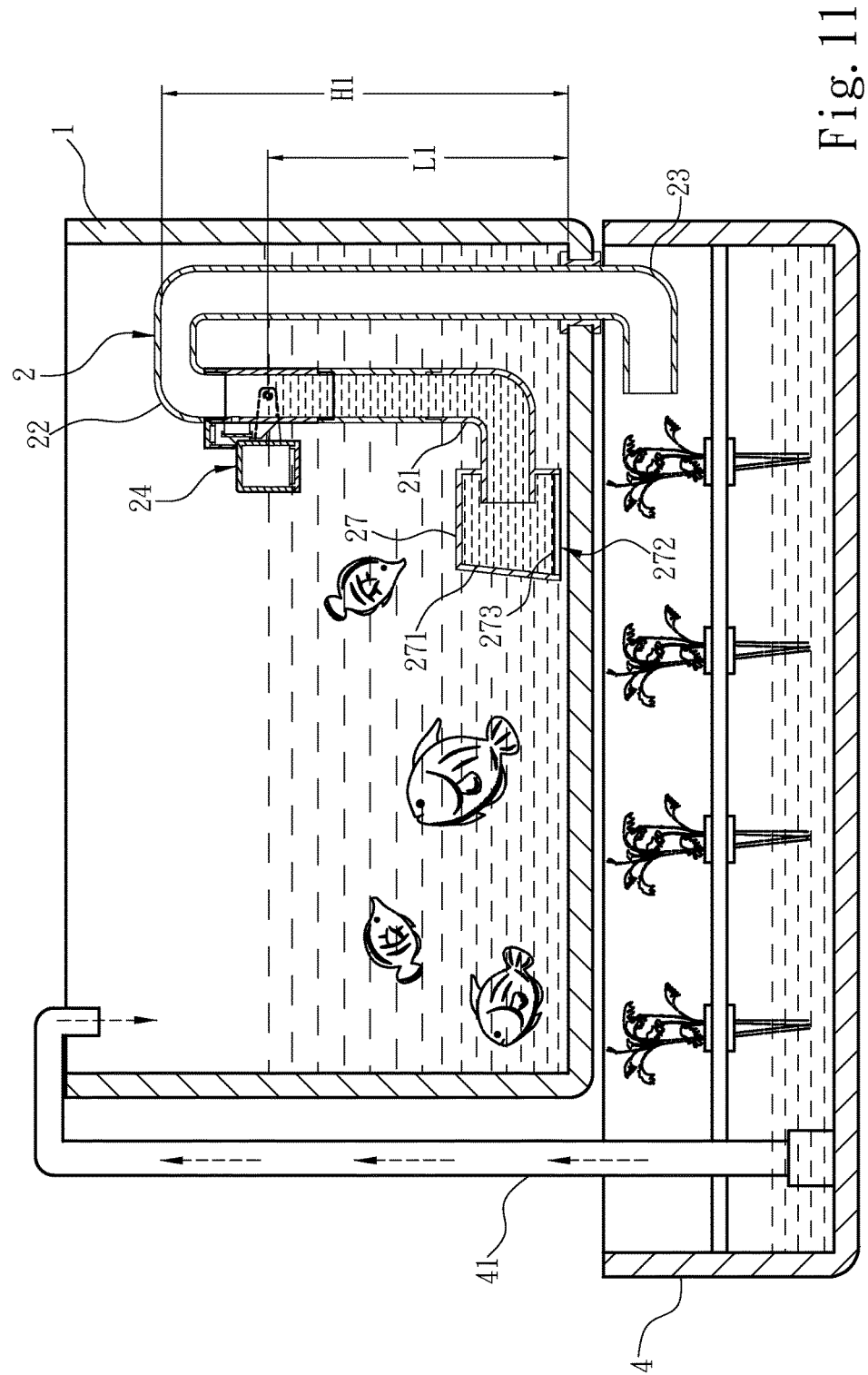
FIG. 11 is a schematic view of the invention implemented in an aquaponics architecture.

In addition, the invention also can be adapted to an aquaponic architecture. As shown in FIG. 11, in yet another embodiment the aquatic cultivation system further includes a plant cultivation pot 4 which includes a liquid conveying element 41 extended to the bowl 1. More specifically, the liquid conveying element 41 includes a water pump located in the plant cultivation pot 4 and a conveying pipe connected to the water pump and extended to the interior of the bowl 1. When the siphon equipment 2 enters the first state the liquid exit tube 23 can discharge the liquid contained the filths to the plant cultivation pot 4 as fertilizer, and the plant cultivation pot 4 can convey the liquid through the liquid conveying element 41 to the bowl 1, thereby the liquid can be used repeatedly to maintain biological balance of the aquatic creatures and plants in the bowl 1 and the aquatic cultivation plants in the plant cultivation pot 4.

As a conclusion, the aquatic cultivation system of the invention includes a bowl and a siphon equipment. The bowl contains a liquid. The siphon equipment includes a liquid intake tube located in the bowl, a U-shaped tube connected to the liquid intake tube and a liquid exit tube connected to the U-shaped tube and extended outside the bowl. At least one of the liquid intake tube and the liquid exit tube includes an air vent corresponding to an internal section of the bowl. The siphon equipment includes a water level control element corresponding to the air vent. During the aquatic cultivation system is in use the water level control element can close or release the air vent through elevation change of the liquid level, thereby can remove the filths in the bowl and also intermittently generate turbulent current to prevent the filths from depositing at the bottom of the bowl. In addition, the elevation of the water level control element can also be directly adjusted by users to change the liquid lowering range to match the volume of the bowl or meet use requirements, thereby can resolve the complicated use problem occurred to the conventional techniques.

What is claimed is:

1. An aquatic cultivation system, comprising:
a bowl to store a liquid; and
a siphon equipment which is located in the bowl to provide a siphon function to draw the liquid from the bottom side of the bowl to the exterior and includes a liquid intake tube extended toward the bottom end of the bowl, a U-shaped tube connected to the liquid intake tube and a liquid exit tube connected to the U-shaped tube and extended outside the bowl, at least one of the liquid intake tube and the liquid exit tube having an air vent corresponding to an internal section of the bowl, the siphon equipment further including a water level control element corresponding to the air vent, the water level control element including at least one connection portion and a brake portion connected to the connection portion and included a leaning surface, and being subject to movement of the liquid level elevation to move on a reciprocal movement locus which includes a first position defined by closing the air vent by the leaning surface and a second position defined by releasing the air vent by the leaning surface to allow external air to enter through the air vent to suspend the siphon function.

2. The aquatic cultivation system of claim 1, wherein the brake portion includes a floating structure coupled on the connection portion and an elastic colloid located on the floating structure to seal the air vent, the elastic colloid having one side faced the air vent to be defined as the leaning surface.

3. The aquatic cultivation system of claim 2, wherein the floating structure includes an air chamber.

4. The aquatic cultivation system of claim 1, wherein the water level control element includes a sleeve connected to the connection portion and coupled with either the liquid intake tube or the liquid exit tube, the air vent being located on the sleeve.

5. The aquatic cultivation system of claim 1, wherein the bowl includes a spacer to divide the interior of the bowl into a cultivation zone and a liquid drawing zone, the spacer including at least one turbulent current port at the bottom thereof communicating with the cultivation zone and the liquid drawing zone to allow the liquid to flow through.

6. The aquatic cultivation system of claim 5, wherein the bowl includes a first bottom surface located in the cultivation zone and a second bottom surface located in the liquid drawing zone, the first bottom surface being formed at an elevation higher than that of the second bottom surface.

7. The aquatic cultivation system of claim 1, wherein the bowl includes an indented filth collection zone in the center thereof and a filth collection slant chute extended in an inclined manner from the periphery of the bowl toward the filth collection zone.

8. The aquatic cultivation system of claim 1, wherein the bowl includes an elevation adjust element inside that includes a flow directing passage connected to the turbulent current port.

9. The aquatic cultivation system of claim 1, wherein the siphon equipment includes a siphon ancillary element located at a distal end of the liquid intake tube, the siphon ancillary element including a siphon air chamber connected to the liquid intake tube, a liquid inlet connected to the siphon air chamber and an isolation element located in the liquid inlet.

10. The aquatic cultivation system of claim 1 further including a plant cultivation pot which receives the liquid from the liquid exit tube, the liquid in the plant cultivation pot being drawn via a liquid drawing element and sent to the bowl for storing.

* * * * *